United States Patent [19]

Okuzawa

[11] Patent Number: 4,523,246
[45] Date of Patent: Jun. 11, 1985

[54] FLEXIBLE MAGNETIC DISK
[75] Inventor: Yasutoshi Okuzawa, Odawara, Japan
[73] Assignee: Fuji Photo Film Co., Ltd., Kanagawa, Japan
[21] Appl. No.: 591,878
[22] Filed: Mar. 21, 1984
[30] Foreign Application Priority Data Mar. 29, 1983 [JP] Japan .................................. 58-53171

[51] Int. Cl.$^3$ ...................... G11B 23/02; G11B 5/016
[52] U.S. Cl. ..................................... 360/133; 360/99; 360/132
[58] Field of Search ................ 360/132, 133, 131, 97, 360/98, 99, 128, 137; 369/283; 206/313

[56] References Cited

U.S. PATENT DOCUMENTS

| | | | |
|---|---|---|---|
| 4,223,361 | 9/1980 | Zaitsu | 360/133 |
| 4,374,404 | 2/1983 | Davis | 360/133 |
| 4,376,293 | 3/1983 | Teramura | 360/99 |
| 4,413,298 | 11/1983 | Pecsok | 360/133 |
| 4,419,164 | 12/1983 | Martinelli | 360/128 |
| 4,430,678 | 2/1984 | Hack | 360/97 |

Primary Examiner—Robert M. Kilgore
Attorney, Agent, or Firm—Murray, Whisenhunt & Ferguson

[57] ABSTRACT

A flexible magnetic disk comprises a jacket and a flexible magnetic disk sheet housed in the jacket. The flexible magnetic disk is provided at the center with a circular hole for engagement with a sheet positioning member of an information writing and read-out apparatus. The jacket has an aperture for exposing the circular hole of the flexible magnetic disk sheet. The peripheral edge portion of the circular hole which comes into contact with the sheet positioning member is provided with at least one lubricant layer to decrease the coefficient of friction of the peripheral edge portion to 0.45 or less, so that the flexible magnetic disk sheet is correctly positioned by the sheet positioning member.

5 Claims, 7 Drawing Figures

FLEXIBLE MAGNETIC DISK

BACKGROUND OF THE INVENTION

1. Field of the Invention

This invention relates to an improvement in a flexible magnetic disk.

2. Description of the Prior Art

Conventionally, flexible magnetic disks comprising a jacket and a flexible magnetic disk housed therein are used for magnetic recording and reproducing. The jacket and the sheet have circular holes at the centers thereof for engagement with sheet positioning members of an information writing apparatus or an information read-out apparatus. Thus the sheet is rotated by a rotatable section of the sheet positioning members for magnetically recording information in the sheet or for magnetically reproducing information from the sheet. In the magnetic disk of this type, since the sheet is housed in the jacket in slightly spaced relation to the jacket, the position of the sheet sometimes deviates from the center of the jacket during storage, handling or carrying of the magnetic disk. When the magnetic disk is loaded into a writing apparatus or a read-out apparatus in this condition, the circular hole at the center of the sheet is positioned eccentrically with respect to the sheet positioning members (collet and rotatable section) of the apparatus. Thus the sheet is held in an eccentric position, and it becomes impossible to correctly write information into the sheet or to correctly read information out of the sheet.

FIG. 1A is a plan view showing an example of the flexible magnetic disk, and FIG. 1B is a sectional view of the flexible magnetic disk shown in FIG. 1A. The flexible magnetic disk comprises a rectangular jacket 1 having a circular aperture 1a in the center, and a flexible magnetic disk sheet 2 having a circular hole 2a in the center. The magnetic disk sheet 2 is rotatably housed in the jacket 1 so that the peripheral edge portion of the circular hole 2a of the magnetic disk sheet 2 is exposed within the circular aperture 1a of the jacket 1.

FIG. 2 is a partially sectional view showing the condition of loading the flexible magnetic disk between sheet positioning members in a writing apparatus or a read-out apparatus. FIG. 3 is a partially sectional view showing the condition of the flexible magnetic disk sheet of the flexible magnetic disk held in an eccentric position with respect to the sheet positioning members in a writing apparatus or a read-out apparatus. FIG. 4 is a partially sectional view showing the condition off the flexible magnetic disk sheet of the flexible magnetic disk correctly positioned by the sheet positioning members in a writing apparatus or a read-out apparatus.

As shown in FIG. 2, when the aforesaid flexible magnetic disk is loaded into a writing apparatus or a read-out apparatus, a rotatable section 3 of the sheet positioning member is contacted with the magnetic disk sheet 2 from below, and a collet 4 of the sheet positioning members is moved down and fitted into a circular recess 3a of the rotatable section 3. However, the peripheral edge portion of the circular hole 2a of the sheet 2 is not always aligned with the peripheral edge portion of the circular recess 3a of the rotatable section 3, but instead often deviates from the peripheral edge portion of the circular recess 3a. As shown in FIG. 3, when the collet 4 is moved down in this condition, a part of the peripheral edge portion of the circular hole 2a of the sheet 2 is sandwiched between the collet 4 and the peripheral edge portion of the circular recess 3a of the rotatable section 3. As a result, the sheet 2 is held eccentrically with respect to the rotatable section 3 and the collet 4, and rotated in this condition in the writing apparatus or in the read-out apparatus. Such positioning of the sheet 2 must be avoided since writing of information into the sheet 2 and read-out of information therefrom are not conducted correctly unless the sheet 2 is rotated with the center thereof exactly aligned with the rotation axis. Further, when the sheet 2 is rotated in the eccentrically held condition, flatness of the sheet 2 is adversely affected, and the sheet 2 is subject to flapping motion during rotation. In order that the sheet 2 be correctly positioned on the peripheral edge portion of the circular recess 3a, as shown in FIG. 4, as the collet 4 is moved down, it is desired that the coefficient of friction of the sheet 2 with respect to the rotatable section 3 and the collet 4 be low.

SUMMARY OF THE INVENTION

The primary object of the present invention is to provide a flexible magnetic disk which is loaded in a correct position into an information writing apparatus or into an information read-out apparatus.

Another object of the present invention is to provide a flexible magnetic disk comprising a flexible magnetic disk sheet exhibiting a low coefficient of friction with respect to sheet positioning members of an information writing apparatus or an information read-out apparatus.

The flexible magnetic disk of the present invention comprises a jacket and a flexible magnetic disk sheet housed in said jacket, said flexible magnetic disk sheet being provided at the center thereof with a circular hole for loading into an information writing and read-out apparatus, said jacket being provided with an aperture for exposing said circular hole of said flexible magnetic disk sheet, wherein the improvement comprises applying a lubricant onto one surface or both surfaces of said flexible mmagnetic disk sheet at the peripheral edge portion of said circular hole which comes into contact with at least one sheet positioning member of said information writing and read-out apparatus, thereby decreasing the coefficient of friction of said peripheral edge portion of said circular hole.

By "coefficient of friction of said peripheral edge portion" is meant the coefficient of frction of the peripheral edge portion of the circular hole in the flexible magnetic disk sheet with respect to the (upper and lower) sheet positioning members of an information writing apparatus or an information read-out apparatus. By the application of a lubricant, the coefficient of friction of the peripheral edge portion with respect to the upper sheet positioning member should preferably be adjusted to 0.45 or less, and the coefficient of friction thereof with respect to the lower sheet positioning member should preferably be adjusted to 0.3 or less. In this case, the sheet is pushed by the slant surface of the upper sheet positioning member (i.e. the aforesaid collet) and smoothly moved from an eccentric position to the concentric position with respect to the lower sheet positioning member (i.e. the aforesaid rotatable section), as the collet is moved down from above the sheet for positioning the sheet in the writing apparatus or in the read-out apparatus. Thus the sheet can be correctly positioned in the apparatus.

The present invention will hereinbelow be described in further detail with reference to the accompanying drawings.

DETAILED DESCRIPTION OF THE INVENTION

Figure 1A:
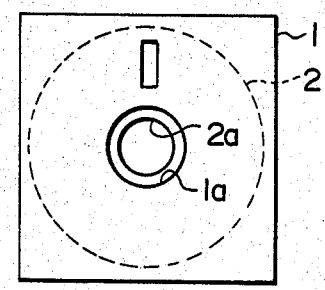
FIG. 1A is a plan view showing an example of the flexible magnetic disk.
Figure 1B:
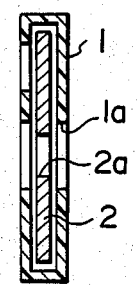
FIG. 1B is a sectional view showing the flexible magnetic disk of FIG. 1A.
Figure 2:
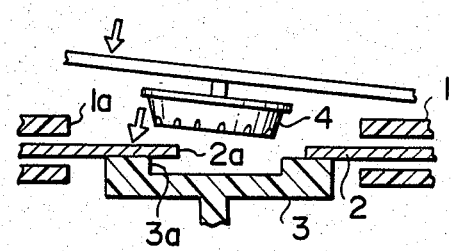
FIG. 2 is a partially sectional view showing the condition of loading the flexible magnetic disk between sheet positioning members in an information writing apparatus or an information read-out apparatus.
Figure 3:
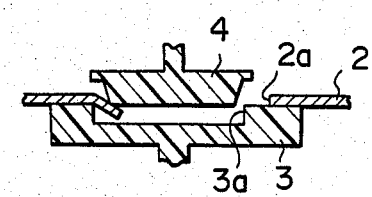
FIG. 3 is a partially sectional view showing the condition of the flexible magnetic disk sheet of the flexible magnetic disk held in an eccentric position with respect to the sheet positioning members in an information writing apparatus or an information read-out apparatus.
Figure 4:
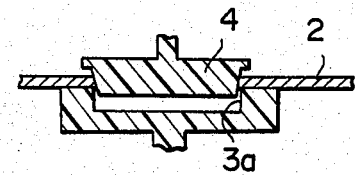
FIG. 4 is a partially sectional view showing the condition of the flexible magnetic disk sheet of the flexible magnetic disk correctly positioned by the sheet positioning members in an information writing apparatus or an information read-out apparatus.
Figure 5:
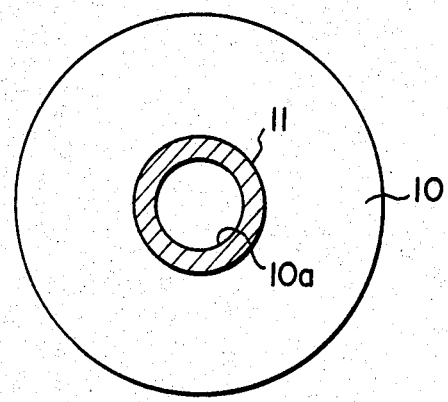
FIG. 5 is a plan view showing the flexible magnetic disk sheet portion of an embodiment of the flexible magnetic disk in accordance with the present invention.

Referring to FIG. 5, the flexible magnetic disk in accordance with the present invention comprises a flexible magnetic disk sheet 10 having a circular hole 10a at the center. One surface of both surfaces of the sheet 10 are provided with a lubricant layer 11 along the ring-like peripheral edge portion of the circular hole 10a. (Or, the magnetic layer of the flexible magnetic disk sheet may be impregnated with a lubricant.) The width of the lubricant layer 11 may be about 3 mm. By way of example, the size of the sheet 10 is 8 inch (8×25.4 mm) or 5 inch (5×25.4 mm). As the lubricant for forming the lubricant layer 11, a solution (e.g. a 3% solution) of myristic acid or the like may be used.

Figure 6:
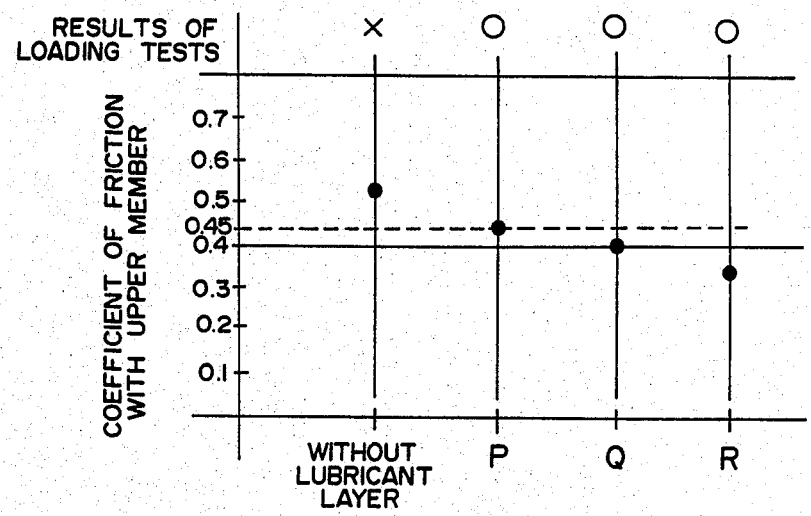
FIG. 6 is a graph showing the technical effects of the flexible magnetic disk in accordance with the present invention.

Loading tests were conducted on the flexible magnetic disks constructed as described above in accordance with the present invention. In the loading tests, good results were obtained when the coefficient of friction of the peripheral edge portion having the lubricant layer 11 with respect to an upper sheet positioning member of a writing apparatus or a read-out apparatus was 0.45 or less, and the coefficient of friction thereof with respect to the lower sheet positioning member of the apparatus was 0.30 or less. FIG. 6 shows the results of the loading tests with reference to the coefficient of friction with respect to the upper sheet positioning member. In FIG. 6, P indicates the case where myristic acid was used as the lubricant as described above. Q and R indicate the cases where an oleic acid-based lubricant and a silicone-based lubricant were used, respectively. Also, the mark "o" indicates that the results of the loading tests were good, and the mark "x" indicates that the results of the loading tests were not good. The tests were conducted at a feed rate of the upper sheet positioning member (collet) and the flexible magnetic disk sheet of 0.8 mm/second, an applied load of 70 gram-weight, an ambient temperature of 23° C., and relative humidity of 70%.

As is clear from the foregoing and the test results shown in FIG. 6, the coefficient of friction ($\mu$ value) of the flexible magnetic disk sheet with respect to the upper sheet positioning member of a writing apparatus or a read-out apparatus should be 0.45 or less. When loading tests were conducted with reference to the coefficient of friction with respect to the lower sheet positioning member (rotatable section) of the apparatus in the same manner as described above, good test results were obtained when the coefficient of friction with respect to the lower positioning member was 0.30 or less.

I claim:

1. A flexible magnetic disk comprising a jacket and a flexible magnetic disk sheet housed in said jacket, said flexible magnetic disk sheet being provided at the center thereof with a circular hole for loading into an information writing and read-out apparatus, said jacket being provided with an aperture for exposing said circular hole of said flexible magnetic disk sheet, wherein the improvement comprises applying a lubricant onto one surface or both surfaces of said flexible magnetic disk sheet at the peripheral edge portion of said circular hole which comes into contact with at least one sheet positioning member of said information writing and read-out apparatus, thereby decreasing the coefficient of frcition of said peripheral edge portion of said circular hole.

2. A flexible magnetic disk as defined in claim 1 wherein the coefficient of friction of said peripheral edge portion of said circular hole is 0.45 or less.

3. A flexible magnetic disk as defined in claim 2 wherein the coefficient of friction of said peripheral edge portion of said circular hole with respect to an upper sheet positioning member of said information writing and read-out apparatus is 0.45 or less, and the coefficient of friction thereof with respect to a lower sheet positioning member of said apparatus is 0.3 or less.

4. A flexible magnetic disk as defined in claim 1 wherein the width of the lubricant layer on said peripheral edge portion is about 3 mm.

5. A flexible magnetic disk as defined in claim 1 wherein said lubricant is selected from the group consisting of myristic acid, oleic acid and a silicone-based lubricant.

* * * * *